(12) United States Patent
Watanabe et al.

(10) Patent No.: US 10,139,964 B2
(45) Date of Patent: Nov. 27, 2018

(54) CONTROL APPARATUS FOR A TOUCH PANEL AND CONTROL METHOD FOR THE TOUCH PANEL

(71) Applicant: CANON KABUSHIKI KAISHA, Tokyo (JP)

(72) Inventors: Kyosuke Watanabe, Kawasaki (JP); Takehiko Kasamatsu, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 14/316,661

(22) Filed: Jun. 26, 2014

(65) Prior Publication Data

US 2015/0002459 A1  Jan. 1, 2015

(30) Foreign Application Priority Data

Jun. 28, 2013 (JP) ................................. 2013-137061

(51) Int. Cl.
  *G06F 3/044* (2006.01)
  *G06F 3/041* (2006.01)

(52) U.S. Cl.
  CPC ............ *G06F 3/044* (2013.01); *G06F 3/0418* (2013.01)

(58) Field of Classification Search
  CPC ....... G06F 3/044; G06F 3/0418; G06F 3/0416
  USPC ........................................................ 345/173
  See application file for complete search history.

(56) References Cited

U.S. PATENT DOCUMENTS

| 5,565,658 A * | 10/1996 | Gerpheide | G06F 3/041 |
| | | | 178/18.02 |
| 9,164,605 B1 * | 10/2015 | Pirogov | G06F 3/041 |
| 2008/0018596 A1 * | 1/2008 | Harley | G06F 3/0354 |
| | | | 345/157 |
| 2010/0060609 A1 * | 3/2010 | Doi | G06F 3/044 |
| | | | 345/174 |
| 2011/0157076 A1 * | 6/2011 | Chang | G06F 3/0418 |
| | | | 345/174 |
| 2013/0021293 A1 * | 1/2013 | Nakai | G06F 1/1626 |
| | | | 345/174 |
| 2013/0106735 A1 * | 5/2013 | Lee | G06F 3/0416 |
| | | | 345/173 |
| 2013/0150132 A1 * | 6/2013 | Izumi | G06F 3/0418 |
| | | | 455/566 |
| 2014/0062947 A1 * | 3/2014 | Zhou | G06F 3/0418 |
| | | | 345/174 |
| 2014/0210780 A1 * | 7/2014 | Lee | G06F 3/03545 |
| | | | 345/174 |

FOREIGN PATENT DOCUMENTS

| JP | 2007-208682 A | 8/2007 |
| JP | 2012-104102 A | 5/2012 |

* cited by examiner

*Primary Examiner* — Yuzhen Shen
(74) *Attorney, Agent, or Firm* — Canon USA Inc., IP Division

(57) ABSTRACT

A determination is made, on the basis of an electrostatic capacitance value of an electrostatic sensor provided to electrostatic touch panel and a reference value, whether or not the electrostatic touch panel is operated, and the reference value is modified to be increased in a case where it is determined that the electrostatic touch panel is operated and a variation of the electrostatic capacitance value is higher than or equal to a first threshold.

14 Claims, 13 Drawing Sheets

CONTROL APPARATUS FOR A TOUCH PANEL AND CONTROL METHOD FOR THE TOUCH PANEL

BACKGROUND OF THE INVENTION

Field of the Invention

The present invention relates to a control apparatus for an electrostatic type touch panel and a control method for the electrostatic type touch panel.

Description of the Related Art

In recent years, the number of information processing apparatuses provided with a touch panel as a user interface has been increased. The touch panel includes a resistance film type, an infra-red type, and an electrostatic capacitance type.

The touch panel of the electrostatic capacitance type is configured to determine whether or not the touch panel is touched on the basis of a change in an electrostatic capacitance. Specifically, a plurality of electrostatic sensor patterns made of indium tin oxide (ITO) or the like are arranged, and when an increase in the electrostatic capacitance of any one of the electrostatic sensor patterns as compared with a non-operation state is detected, it is determined that the touch panel is touched. According to Japanese Patent Laid-Open No. 2007-208682, an electrostatic capacitance value corresponding to a reference of the non-operation state is stored in advance, a change in the electrostatic capacitance is detected, and in a case where a variation thereof is higher than or equal to a previously set value, it is determined that the touch panel is touched by a finger or the like.

However, a temperature of a finger of a user who performs an operation may be higher than that of the touch panel in many cases. Therefore, when the finger of the user touches the touch panel for a long time or when the finger of the user touches the touch panel that has been placed in a low temperature environment, heat is conducted to the touch panel from the finger, and a dielectric constant of the electrostatic sensor may be changed. In this case, even when the finger is released from the touch panel, a difference exists from an electrostatic capacitance value in the non-operation state before the finger touches the touch panel, and it is determined that the touch panel is in an operation state, which leads to a problem that a malfunction occurs.

SUMMARY OF THE INVENTION

According to an aspect of the present invention, there are provided a control apparatus for an electrostatic type touch panel with which the above-described problems are solved and a control method for the electrostatic type touch panel. In addition, according to another aspect, there are provided a control apparatus for a touch panel with which an erroneous determination and an operation fault based on the temperature change of the touch panel by the touch operation can be suppressed, a control method for the touch panel, and a program.

An apparatus configured to solve the above-described problems includes a determination unit configured to determine, on the basis of an electrostatic capacitance value of an electrostatic sensor provided to an electrostatic touch panel and a reference value, whether or not the electrostatic touch panel is operated, and a modifying unit configured to modify the reference value to be increased in a case where it is determined that the electrostatic touch panel is operated by the determination unit and a variation of the electrostatic capacitance value is higher than or equal to a first threshold.

Further features of the present invention will become apparent from the following description of exemplary embodiments with reference to the attached drawings.

DESCRIPTION OF THE EMBODIMENTS

First Exemplary Embodiment

Hereinafter, an information processing apparatus according to an exemplary embodiment of the present invention will be described in detail with reference to the drawings.

Figure 1:
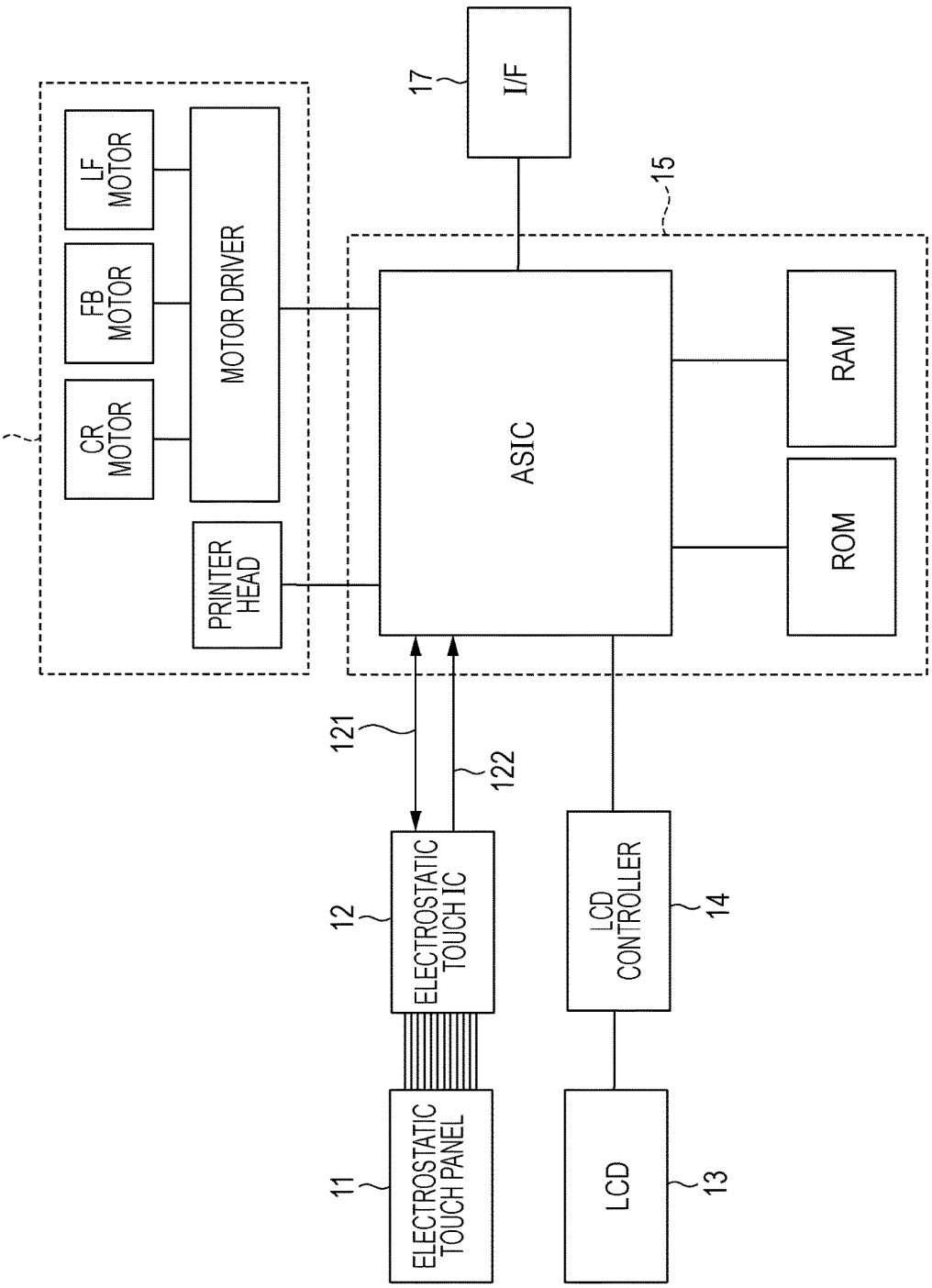
FIG. 1 is a block diagram of an information processing apparatus according to a first exemplary embodiment.

FIG. 1 is a block diagram of an information processing apparatus according to an exemplary embodiment of the present invention.

The information processing apparatus according to the exemplary embodiment is a printer provided with an electrostatic touch panel 11, an electrostatic touch IC 12, a display apparatus, an LCD controller 14, a control unit 15, a printer engine unit 16, and an interface unit 17.

The electrostatic touch panel 11 is a touch panel of an electrostatic capacitance type and is a user interface of the information processing apparatus. Although a detail will be described below, the electrostatic touch panel 11 is provided with an operation unit including a cover lens that is made, for example, of acrylic, glass, or the like. The cover lens and a plurality of sensor patterns made of indium tin oxide (ITO) or the like are fixed by an adhesive sheet or the like.

The electrostatic touch IC 12 includes a measurement unit configured to measure an electrostatic capacitance of the electrostatic touch panel 11 and a determination unit configured to determine whether a user operates the touch panel on the basis of the measured electrostatic capacitance. In addition, it is also possible to determine which location of the electrostatic touch panel is operated on the basis of how much the electrostatic capacitance is changed at which one of the electrostatic sensor patterns provided to the electrostatic sensor.

According to the present exemplary embodiment, the electrostatic touch IC 12 also includes a liquid crystal display (hereinafter also referred to as LCD) 13 as a display apparatus. The LCD 13 is arranged on a lower surface of the electrostatic touch panel 11 and displays predetermined information to the user.

The LCD controller 14 is a controller for driving the LCD 13 and is connected to the LCD 13.

The control unit 15 is a main control unit configured to perform a control on the entire printer and is provided with an ASIC having a CPU and a timer function built therein, a ROM having a built-in program for operating the printer, and a RAM used as a work area for the CPU. The CPU executes information processing described according to the first exemplary embodiment while following the program. Specifically, the CPU loads the program onto the RAM from the ROM, a secondary storage apparatus, or the like and executes the loaded program to control the entire information processing apparatus.

The printer engine unit 16 is provided with a printer head, a carriage motor (CR motor), a line feed motor (LF motor), a flat bed motor (FB motor), and a motor driver for performing a print operation. The CR motor is a motor configured to move the printer head to a printing location. The LF motor is a motor configured to operate a mechanism for discharging or feeding paper for the printing. The FB motor is a motor configured to operate a reading unit in a flat bed type scanner. The printer engine unit 16 operates the printer head, the CR motor, the LF motor, and the FB motor via the motor driver on the basis of signals from the control unit 15.

The interface unit 17 is an interface to be connected to an external device such as a PC.

The control unit 15 also performs a control on a display screen of the LCD 13 by transferring display screen data to the LCD controller 14. The control unit 15 and the electrostatic touch IC 12 are connected to each other via a communication line 121. The control unit 15 can issue an operation command to the electrostatic touch IC 12 and can also read a state of the electrostatic touch IC 12. An interrupt signal line 122 for notifying from the electrostatic touch IC 12 that the state of the electrostatic touch IC 12 is changed is also connected to the control unit 15. The control unit 15 detects an operation state of the user via the interrupt signal line 122 in accordance with the state of the electrostatic touch IC 12 and performs a control of a screen switch of the LCD 13 or a printer operation in accordance with the operation content.

Figure 2:
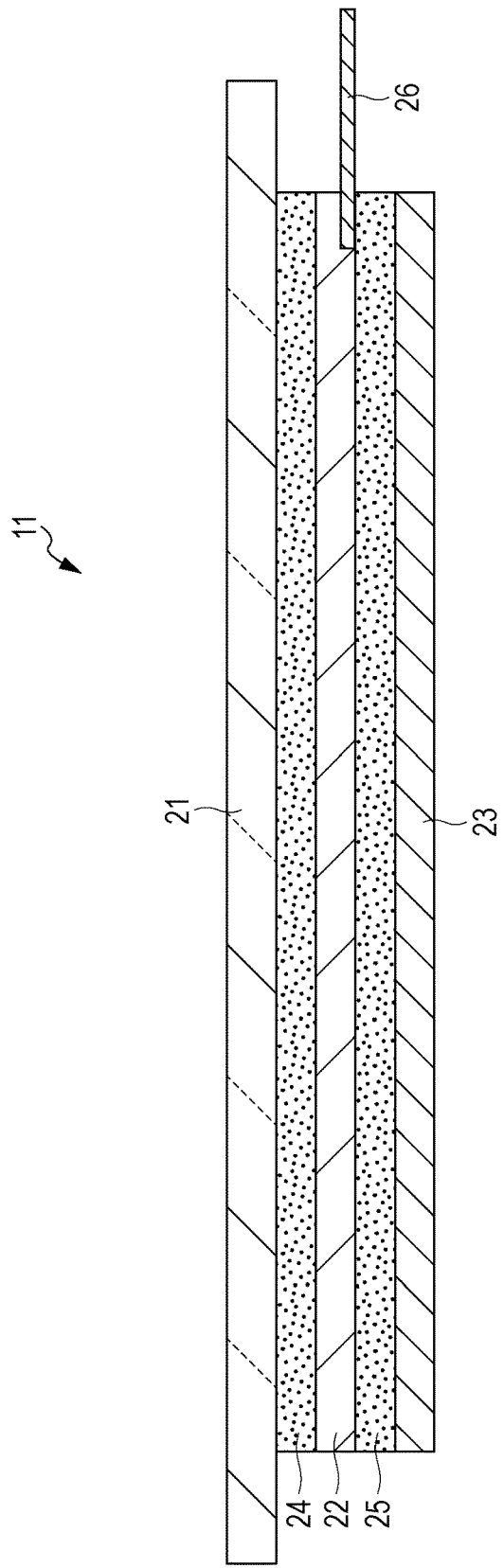
FIG. 2 is a cross sectional view of an electrostatic touch panel according to the first exemplary embodiment.

Herein, the electrostatic touch panel 11 according to the present exemplary embodiment will be described by using FIG. 2. FIG. 2 is a cross sectional view of the electrostatic touch panel 11. As illustrated in FIG. 2, the electrostatic touch panel 11 is constituted by laminating a cover lens 21, an adhesive sheet 24, a sensor layer 22, an adhesive sheet 25, and a protective film 23 in the stated order. The cover lens 21 is made, for example, of acrylic, glass, or the like. The sensor layer 22 is a layer for detecting the electrostatic capacitance and has a plurality of electrostatic sensor patterns arranged thereon. The protective film 23 is designed to protect the sensor layer 22. The adhesive sheets 24 and 25 respectively close contact the cover lens 21 and the sensor layer 22, and the sensor layer 22 and the protective film 23 to be adhered to each other. A flexible printed circuit (FPC) 26 is provided on the sensor layer 22 and connects a substrate that is not illustrated in the drawing and the electrostatic touch panel 11 to each other.

Figure 3A:
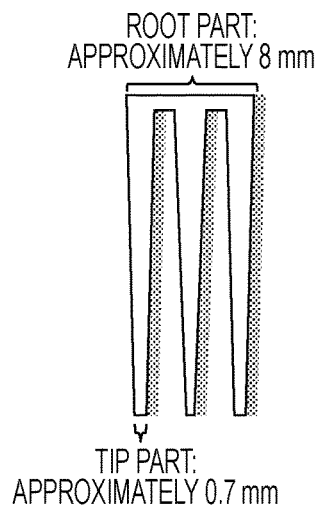
FIGS. 3A, 3B, and 3C are image diagrams of a sensor layer of the electrostatic touch panel according to the first exemplary embodiment.

When a finger, a conductive medium such as a touch pen, or the like touches or approaches the cover lens 21 of the electrostatic touch panel 11 having the above-described configuration, the electrostatic capacitance of the electrostatic sensor at that location is changed. In a case where this change in the electrostatic capacitance is higher than or equal to a threshold, a detection is made since the touch operation has been performed. Specifically, when the sensor layer 22 detects the change in the electrostatic capacitance generated by the contact/non-contact of the finger, the conductive medium, or the like, the presence or absence of the touch operation and the touched location are detected. The sensor layer 22 detects a "touch operation" in which the user contacts a surface of the LCD 13 (surface of the cover lens 21), a "tap operation" in which the user does not move the touched finger and releases the touched finger, a "drag operation" in which the user moves the touched finger, and a "release operation" in which the user releases the touched finger. These detections of the sensor layer 22 are performed by a control of the CPU which will be described below. Herein, the sensor layer 22 will be described by using FIGS. 3A, 3B, and 3C. FIG. 3A illustrates a shape of the electrostatic sensor pattern constituting the sensor layer 22. The shape of the electrostatic sensor pattern of the sensor layer is not particularly limited, but according to the present exemplary embodiment, the shape has an inclination of a trifurcated shape, in which a root is approximately 8 mm, and a tip is approximately 0.7 mm. In this manner, the shapes of the respective electrostatic sensor patterns has a configuration in which the area is decreased towards one direction, and by arranging the electrostatic sensor patterns so as to face each other to form pairs, it is possible to detect an operation location of the electrostatic sensor as will be described below.

Figure 3B:
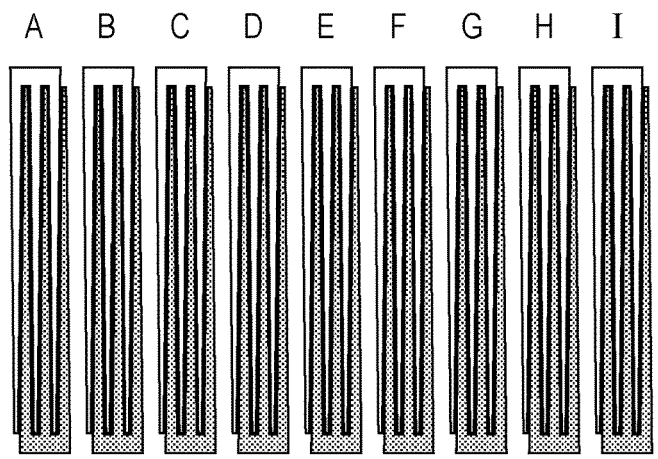

The sensor layer 22 is constituted by arranging a plurality of the electrostatic sensor patterns illustrated in FIG. 3A. Specifically, as illustrated in FIG. 3B, the electrostatic sensor patterns are arranged so as to face each other, and a plurality of these pairs in a horizontal direction in parallel to construct the sensor layer 22. According to the present exemplary embodiment, as illustrated in FIG. 3B, one pair includes the two electrostatic sensor patterns arranged so as to face each other, and 9 pairs are horizontally arranged to construct the sensor layer 22. According to the present exemplary embodiment, as illustrated in FIG. 3B, sensor pair identifiers A to I are allocated to the sensor pairs from the left side, and the sensor pair identifiers are ser for the respective pairs. The operation location of the electrostatic sensor can be obtained on the basis of a location of the pair where the electrostatic capacitance is changed and a ratio of the electrostatic capacitance of one electrostatic sensor pattern constituting the pair to the electrostatic capacitance of the other electrostatic sensor pattern. That is, an X direction of the operation location of the electrostatic sensor (for example, the horizontal direction in the drawing) is obtained on the basis of the location of the pair where the electrostatic capacitance is changed, and Y direction of the operation location (for example, a vertical direction in the drawing) is obtained on the basis of the ratio of the electrostatic capacitances of the electrostatic sensors constituting the pair.

Figure 3C:
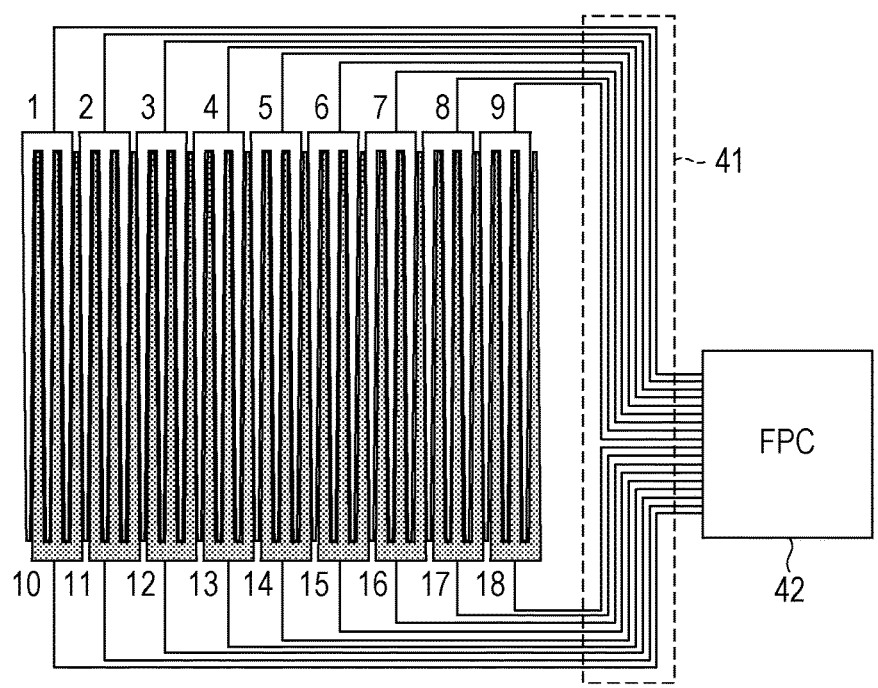

FIG. 3C illustrates an overall view of the sensor layer 22. As illustrated in FIG. 3C, sensor identification numbers are allocated to the respective electrostatic sensor patterns. Sensor identification numbers 1 to 9 are allocated to the sensors on the upper side in the drawing from the left, and the sensor identification numbers 10 to 18 are allocated to the sensors on the lower side from the left. Then, the respective electrostatic sensor patterns 1 to 18 are all connected to an FPC 42 by connection lines 41 such as copper patterns.

Figure 4:
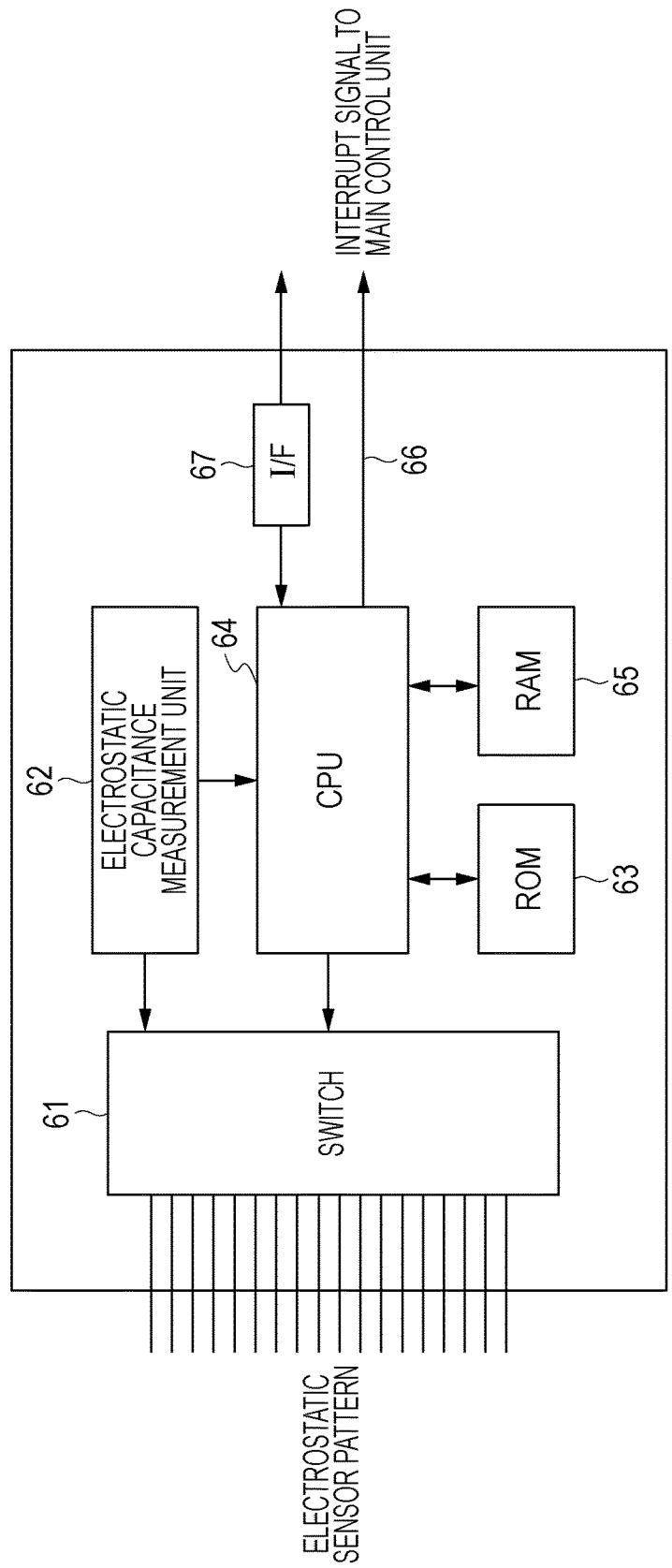
FIG. 4 is a block diagram of an electrostatic touch IC according to the first exemplary embodiment.

Here, a configuration of the electrostatic touch IC will be described by using FIG. 4. FIG. 4 is a block diagram of the electrostatic touch IC 12.

The electrostatic touch IC 12 is provided with a switch 61, an electrostatic capacitance measurement unit 62, a ROM 63, a CPU 64, a RAM 65, an interrupt signal line 66, and an I/F 67. According to this, the electrostatic touch IC 12 has a function of determining on the presence or absence of the operation of the electrostatic touch panel and calculating, when it is determined that the operation is performed, coordinates where the operation is performed.

The switch 61 is an analog switch to which 18 signal lines from the electrostatic touch panel 11 are connected. As described above, the electrostatic touch panel 11 is connected to the FPC via a connector.

The electrostatic capacitance measurement unit 62 measures an electrostatic capacitance of a transparent electrode selected by the switch 61 to detect the electrostatic capacitance.

The CPU 64 executes touch determination processing described according to the first exemplary embodiment while following a program. Specifically, the CPU 64 loads a program from the ROM 63 or the like onto the RAM 65 and executes the program in the RAM 65 to perform an overall control on the electrostatic touch IC 12.

The ROM 63 has a built-in program for operating the CPU 64. The RAM 65 is a work area for the operation of the CPU 64 or a saving area for the measured electrostatic capacitance or the like.

The I/F 67 is a serial interface 12C that connects the electrostatic touch IC 12 to the main control unit 15 and is used for reading a state of the electrostatic touch IC 12.

The electrostatic touch IC 12 detects the electrostatic capacitance of the electrostatic touch panel 11 by the electrostatic capacitance measurement unit 62 to determine on the presence or absence of the operation with respect to the electrostatic touch panel 11. In a case where the operation with respect to the electrostatic touch panel 11 is present, the coordinates where the operation is performed are calculated and held. While the interrupt signal is transmitted to the main control unit 15 via the interrupt signal line 66, the main control unit 15 is notified that the operation state of the electrostatic touch panel 11 is changed. These controls are carried out by the CPU 64.

When the main control unit 15 receives the interrupt signal from the electrostatic touch IC 12, information on the presence or absence of the operation of the electrostatic touch panel 11 and information on the operation coordinates are obtained from the electrostatic touch IC 12 via the I2C interface 67.

Figure 5:
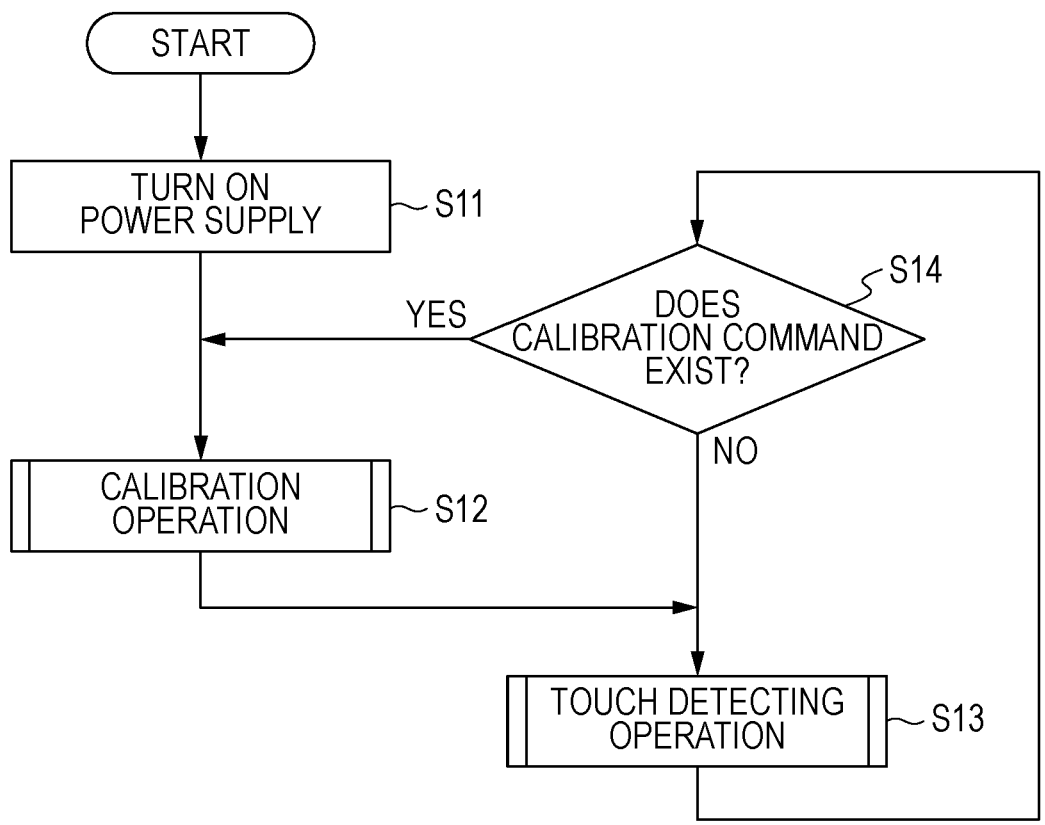
FIG. 5 is an operation flow chart of the electrostatic touch IC according to the first exemplary embodiment.
Figure 6:
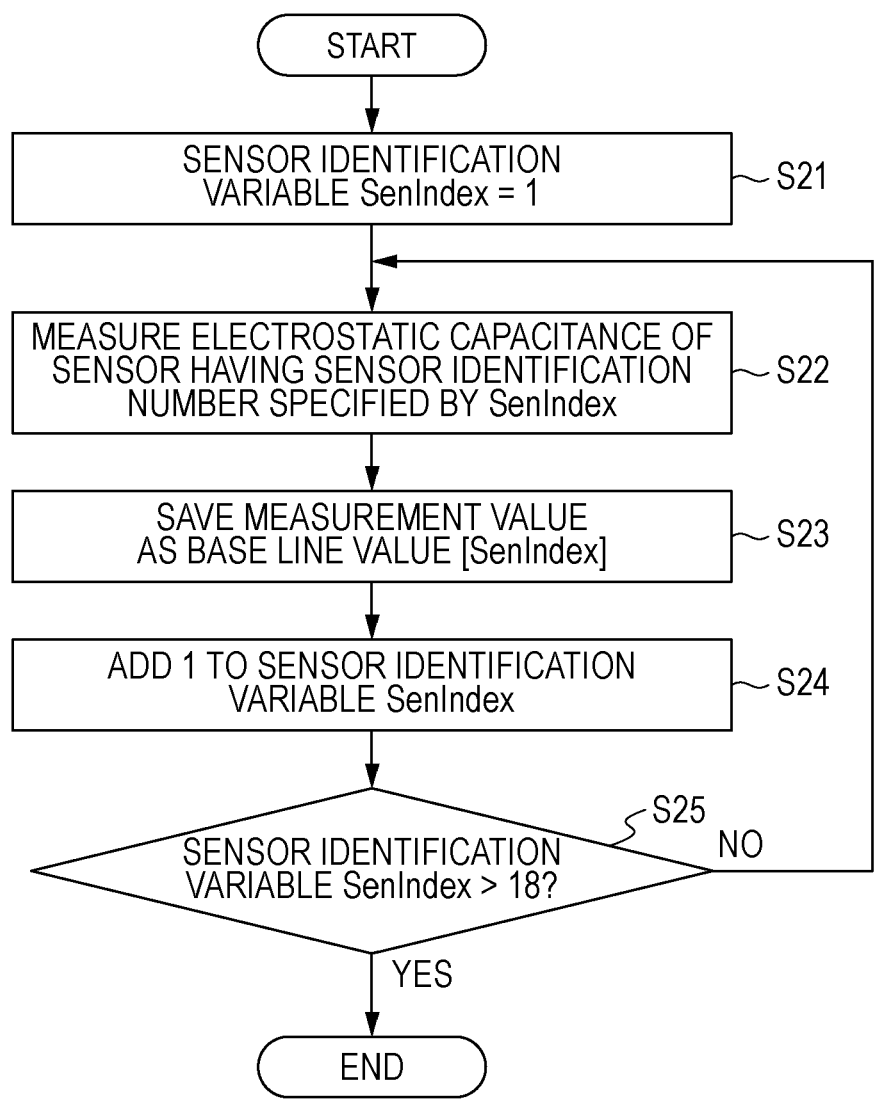
FIG. 6 is an operation flow chart of a procedure for a calibration operation according to the first exemplary embodiment.

Here, an operation of the electrostatic touch IC 12 will be described by using FIG. 5 and FIG. 6. FIG. 5 is an operation flow chart of the electrostatic touch IC 12. The operation of the electrostatic touch IC 12 is executed by the CPU 64. The flow chart of FIG. 5 illustrates the operation from turning on a power supply of the electrostatic touch IC 12 to detection of the touch operation.

As illustrated in FIG. 5, when the power supply of the electrostatic touch IC 12 is turned on (S11), a calibration operation is executed (S12). Here, FIG. 6 illustrates a flow chart of the calibration operation in S12. As described above, the sensor identification numbers 1 to 18 are allocated to the respective electrostatic sensor patterns, and the electrostatic sensor patterns connected via the connector are identified by the sensor identification numbers. It is noted that a sensor identification variable SenIndex varies in a range between 1 and 18.

First, the sensor identification variable SenIndex is set as an initial value (S21).

Next, the electrostatic capacitance of the electrostatic sensor pattern specified by SenIndex is measured (S22), and the measurement result is saved in the RAM 65 as the electrostatic capacitance (S23). The measurement result of the electrostatic capacitance in a case where SenIndex is 1 is saved in the RAM 65 as the electrostatic capacitance in the non-operation state (hereinafter referred to as base line value).

Then, 1 is added to SenIndex to identify the next electrostatic sensor pattern (S24).

It is determined whether or not the sensor identification variable SenIndex is higher than 18, and in a case where SenIndex is lower than or equal to 18, the flow returns to S23. This operation is performed with respect to the 18 electrostatic sensor patterns, and when SenIndex is higher than 18, the processing is ended (S25).

While returning back to FIG. 5, when the calibration operation in S12 is ended, the electrostatic touch IC 12 measures the electrostatic capacitance of the electrostatic sensor pattern and performs a touch detecting operation of detecting the operation of the touch panel by the user on the basis of the measurement result (S13). Then, it is determined whether or not a calibration command from the ASIC is present (S14). In a case where the calibration command is absent, the flow returns to S13. That is, the touch detecting operation is repeatedly performed until the calibration command from the ASIC is transmitted. When the calibration command is transmitted, the flow returns to S12.

Here, the touch detecting operation will be described in detail.

As described above, according to the present exemplary embodiment, the touch detection is performed by the electrostatic capacitance measurement unit 62 on the basis of the change in the electrostatic capacitance of the electrostatic touch panel 11. However, after the finger or the conductive medium is released from the touch panel, the electrostatic capacitance of the electrostatic touch panel may not be returned to the original electrostatic capacitance because of the heat in some cases. This phenomenon occurs, for example, when the finger of the person having a body temperature higher than the temperature of the electrostatic touch panel 11 touches the electrostatic touch panel 11, and the dielectric constant s of the components such as the cover lens 21 and the adhesive sheets 24 and 25 that constitute the touch panel are changed. Particularly, in a case where the state in which the finger contacts the electrostatic touch panel 11 continues for a long time or a case where the finger of the person touches the electrostatic touch panel 11 placed under the low temperature environment, the temperature of the electrostatic touch panel 11 is changed, and the dielectric constant is changed. In this case, when the finger is released (when the release operation is performed), the state is not returned to the electrostatic capacitance value before the finger contacts because of an influence of the cover lens 21, the adhesive sheets 24 and 25, or the like where the dielectric constant is changed, and the electrostatic capacitance value in the non-operation state is increased as compared with the state before the finger contacts the touch panel. That is, even when the release operation is performed, the electrostatic capacitance value in the non-operation state after the finger contacts the touch panel is higher than the electrostatic capacitance value in the non-operation state before the finger contacts, and a difference between the electrostatic capacitance value and the reference value may exceed an operation threshold in some cases. The operation threshold mentioned herein is a threshold for determining on the presence or absence of the touch operation. Therefore, the electrostatic touch IC 12 determines that the electrostatic touch panel 11 is in the operation state.

Figure 7A:
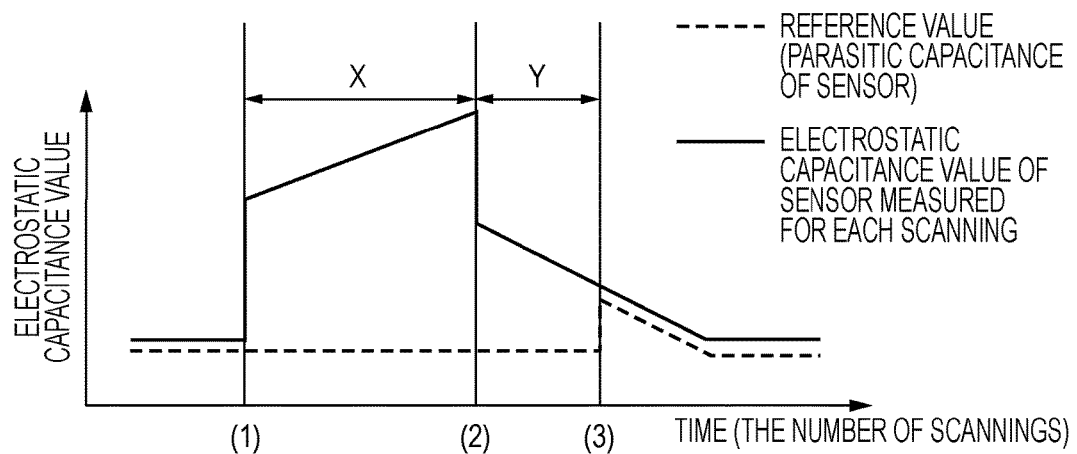
FIGS. 7A and 7B are explanatory diagrams for describing a change in the electrostatic capacitance of the electrostatic sensor and a reference value.
Figure 7B:
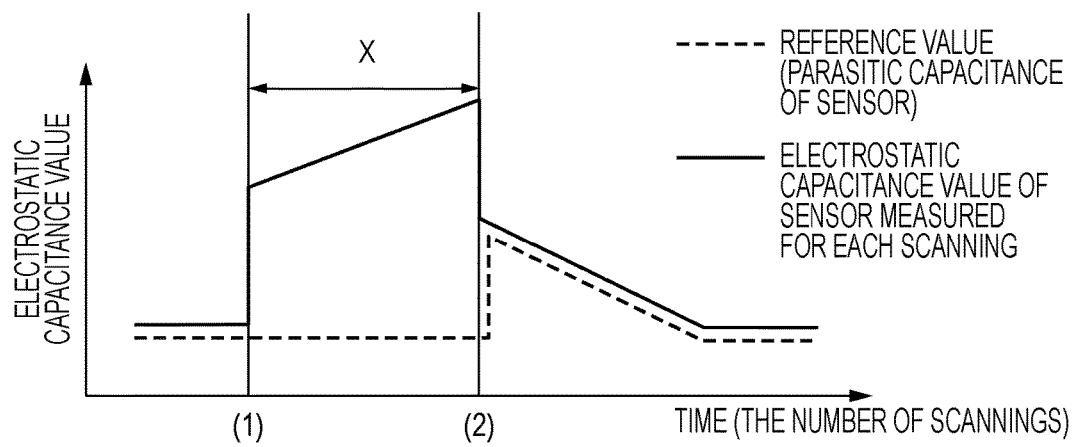

The change in the electrostatic capacitance of the electrostatic sensor pattern will be described by using FIGS. 7A and 7B. As illustrated in FIGS. 7A and 7B, when the finger contacts the electrostatic touch panel 11 (see (1) in FIGS. 7A and 7B), the electrostatic capacitance value is abruptly increased. After that, while the finger contacts the electrostatic touch panel 11 (section X), the dielectric constant of the component in the surrounding of the electrostatic sensor pattern is changed because of the temperature of the finger, and the electrostatic capacitance value is gradually increased. After that, when the finger is released, the electrostatic capacitance is abruptly decreased by the increase amount of the electrostatic capacitance attributed to the touch operation of the finger itself, but the temperature of the touch panel where the temperature has been increased by the finger is not abruptly decreased. Therefore, the electrostatic capacitance value immediately after the finger is released is higher than the electrostatic capacitance value before the finger contacts (see (2) in FIGS. 7A and 7B). After that, the electrostatic capacitance value is gradually decreased along with the temperature decrease of the electrostatic touch panel 11, and the electrostatic capacitance value returns to the original electrostatic capacitance value.

Herein, as illustrated in FIGS. 7A and 7B, the operation threshold is previously set in the touch sensor, and the scanning of each sensor is performed on the basis of the reference value and the operation threshold to measure the electrostatic capacitance, so that the presence or absence of the touch operation is determined. The reference value mentioned herein is a parasitic capacitance (Cp) of the sensor. For example, the electrostatic capacitance value measured for the first time after the power supply of the electrostatic touch panel 11 is turned on may be set as the reference value. The operation threshold is a predetermined fixed value and may appropriately be set by taking noise or the like into account. In a case where the difference between the electrostatic capacitance value and the reference value is higher than or equal to the operation threshold, it is determined that the touch operation is performed. In a case where the difference between the electrostatic capacitance value and the reference value is lower than the operation threshold, the touch operation is not detected. In other words, in a case where the electrostatic capacitance value is higher than or equal to a total value of the operation threshold and the reference value, it is determined that the touch operation is performed. In a case where the electrostatic capacitance value is lower than the total value of the operation threshold and the reference value, the touch operation is not detected. In a case where the touch operation is not detected after the touch operation, it is determined that the release operation is performed.

As illustrated in FIG. 7A, in a case where the reference value is set as the constant until the difference between the electrostatic capacitance value and the reference value after the touch operation (after (1) in FIG. 7A) becomes lower than or equal to the operation threshold, an error between the actual release operation time and the time until the release determination is increased. That is, as illustrated in FIG. 7A, if it is determined that the release operation is performed (see (3) in FIG. 7A) when the difference between the electrostatic capacitance value and the reference value becomes lower than or equal to the operation threshold, the difference of the time until the release determination from the actual release operation (see (2) in FIG. 7A) is increased. Specifically, in a section Y in FIG. 7A, even when the finger is released, it is erroneously determined that the touch operation is continued. In addition, in the section Y, even when the touch operation is performed again after the release operation, this touch operation is not detected. In this manner, in a case where the reference value is set to be constant until the difference between the electrostatic capacitance value and the reference value after the touch operation becomes lower than or equal to the operation threshold, dead times for the touch operation and the release operation exist. This is because the electrostatic capacitance in the non-operation state immediately after the finger is released is not the same as the electrostatic capacitance in the non-operation state before the finger contacts. The section Y in FIG. 7A, that is, a section until a state is established in which the temperature is returned to the original temperature and the electrostatic capacitance is regarded as the same as the electrostatic capacitance in the non-operation state before the finger contacts (a state in which the difference between the electrostatic capacitance value and the reference value is lower than or equal to the operation threshold) corresponds to a dead zone. As illustrated in FIG. 7A, even if the reference value corresponding to the reference of the non-operation state of the electrostatic touch panel 11 is updated at the same time as the release determination (see (3) in FIG. 7A) to follow a surrounding environment, the reference value corresponding to the reference of the non-operation state is not updated until the release determination is performed. That is, in a section until the temperature added to the touch panel by the finger is dissipated and the difference between the electrostatic capacitance value and the reference value becomes lower than or equal to the operation threshold, the update of the reference value is not carried out.

In contrast to this, according to the present exemplary embodiment, as illustrated in FIG. 7B, the reference value is changed (updated) at a predetermined timing after the touch operation is detected, so that it is possible to suppress the operation faults such as the erroneous determination on the touch operation and the non-detection of the touch operation and the release operation. At this time, the timing for changing the reference value may correspond, for example, to a case in which a change in the electrostatic capacitance which is higher by a certain extent from the electrostatic capacitance at the time of the previous scanning occurs, that is, a case in which the electrostatic capacitance is decreased by an amount higher than or equal to a predetermined threshold (hereinafter referred to as update determination threshold). According to the present exemplary embodiment, the timing for changing the reference value updates the reference value when the decrease in the electrostatic capacitance which is higher than or equal to the update determination threshold occurs as compared with the time of the previous scanning and also the difference between the electrostatic capacitance value of the sensor and the reference value which is measured for each scanning is higher than or equal to the operation threshold. According to this, it is possible to set the variation at the time of the update of the reference value (hereinafter referred to as update width)

more appropriately. It is noted that, as illustrated in FIG. 7B, the reference value is gradually decreased after the update.

Herein, the update determination threshold may be set, for example, as a value at which the decrease in the electrostatic capacitance by the release set with respect to the finger having Φ of 9 mm can certainly be determined. The update determination threshold may be, for example, higher than or equal to the operation threshold. That is, the update determination threshold may be set as a same value as the operation threshold or a value obtained by adding a predetermined value to the operation threshold. According to the present exemplary embodiment, the update determination threshold is set as the same value as the operation threshold.

Here, a case where the reference value is to be updated will be described according to the present exemplary embodiment. In the electrostatic touch panel 11, heat is not conducted immediately after the finger of the person contacts the electrostatic touch panel 11. Heat is conducted to the electrostatic touch panel 11 after the contact of the finger for a certain length of time and furthermore, during the period, the location of the finger is not moved. That is, in a gesture operation such as a flick operation or the tap operation, the sensor at the peak is moved, and the touch and release operations are performed in an extremely short interval. Therefore, a probability that the temperature increase of the touch panel is caused by the temperature of the finger or the like is extremely low. Therefore, the update of the reference value is not performed during the above-described gesture operation. The "flick operation" is a quick flicking operation, and the "tap operation" is an operation of releasing the touched finger in a short time without moving the location. According to the present exemplary embodiment, the reference value is updated in a case where the touch operation takes a predetermined time or longer. The "predetermined time" mentioned herein may be set on the basis of a contact time of the finger until the difference between the electrostatic capacitance value of the electrostatic touch panel 11 and the reference value becomes higher than or equal to the operation threshold. Specifically, the "predetermined time" is appropriately set on the basis of the relative dielectric constants of the components constituting the cover lens or the adhesive sheet, the use environment of the electrostatic touch panel 11, and the like. According to the present exemplary embodiment, in a case where the touch lasting for at least seconds is detected, that is, a case where a state in which the difference between the electrostatic capacitance value and the reference value is higher than or equal to the operation threshold lasts for at least 5 seconds, the reference value is updated. To elaborate, in a case where a state in which the electrostatic capacitance value is higher than or equal to the total value of the operation threshold and the reference value lasts for at least 5 seconds, the reference value is updated. For example, in a case where the increase in the electrostatic capacitance lasting for at least 5 seconds after the touch is detected is confirmed, the reference value is updated.

According to this, the state in which the operation of the touch panel is not normally detected until the temperature of the touch panel is returned to the original temperature is alleviated. Specifically, it is possible to avoid the erroneous determination and the operation fault derived from the increase in the electrostatic capacitance of the touch panel which is caused by the temperature increase of the electrostatic touch panel 11 in the presence of the object having a high temperature such as the finger. That is, it is possible to avoid the non-determination state of the touch and release determination caused by the state in which the electrostatic capacitance in the non-operation state after the finger contacts the touch panel is higher than is higher than the electrostatic capacitance in the non-operation state before the finger contacts the touch panel.

Figure 8:
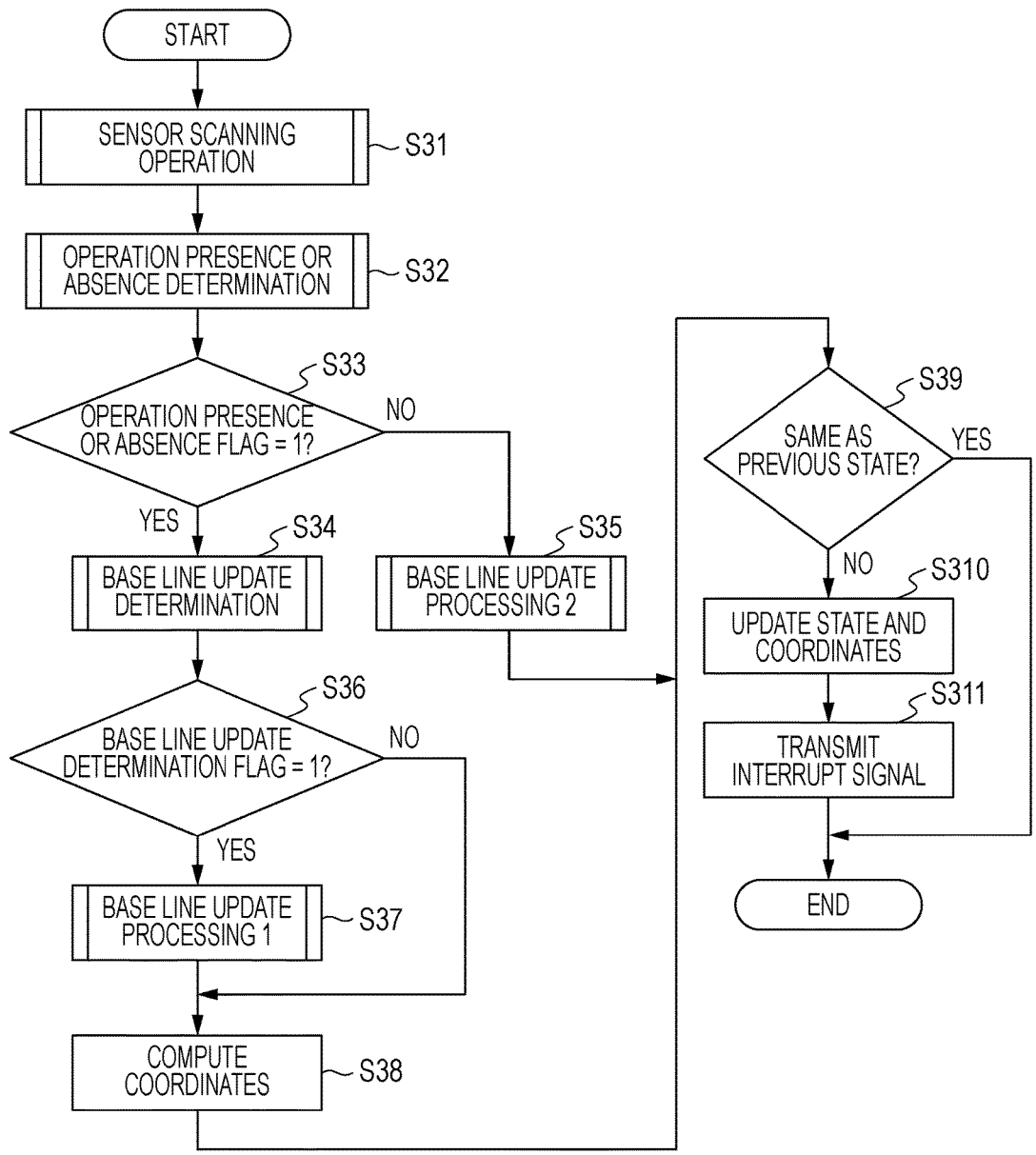
FIG. 8 is a control flow chart of the touch panel according to the first exemplary embodiment.

Here, the detecting operation of the touch operation will be described by using FIGS. 8 to 13. FIG. 8 is a flow chart of the detecting operation for the touch operation by the user. This operation is executed by the CPU 64.

First, sensor scanning is operated (S31). That is, the electrostatic capacitance of the electrostatic sensor pattern is sequentially measured.

Next, the determination processing with regard to the presence or absence of the touch operation is performed (S32). According to the present exemplary embodiment, the determination processing with regard to the presence or absence of the operation of the touch panel is performed on the basis of a DIFF value that will be described below which is saved for each electrostatic sensor pattern, and also the coordinates where the operation is performed are calculated. Then, in a case where a flag indicating the presence or absence of the touch operation is 1 in S33, that is, in a case where the touch operation is detected, the flow proceeds to S34. In a case where the flag indicating the presence or absence of the touch operation is not 1, that is, a case where the touch operation is not detected, base line update processing 2 is executed (S35), and the flow proceeds to S39.

In S34, base line update determination processing is performed (S34). In a case where the flag of the base line update determination is 1, the base line update processing is performed (S37), and the flow proceeds to S38. In a case where the flag of the base line update determination is not 1, the flow directly proceeds to S38.

In S38, coordinate computation of the operation location is performed on the basis of the electrostatic capacitance, and the flow proceeds to S39. The coordinates of the operation location are calculated on the basis of the DIFF values of the respective sensors.

In S39, it is determined whether or not the state is the same as the previous state on the basis of the determination result on the presence or absence of the operation and the coordinate calculation result of the operation location. In a case where the state is the same as the previous state, the detection processing of the touch operation is ended. In a case where the state is not the same as the previous state, that is, a change occurs as compared with the previous operation state and the previous coordinate data, the operation state and the coordinate data are updated to be held in the RAM 65 (S310). After that, the interrupt signal is transmitted to the main control unit 15 (S311), and the detection processing of the touch operation is ended. It is noted that the series of the operations in the flow chart illustrated in FIG. 8 is repeatedly executed at a period of approximately 20 ms.

Figure 9:
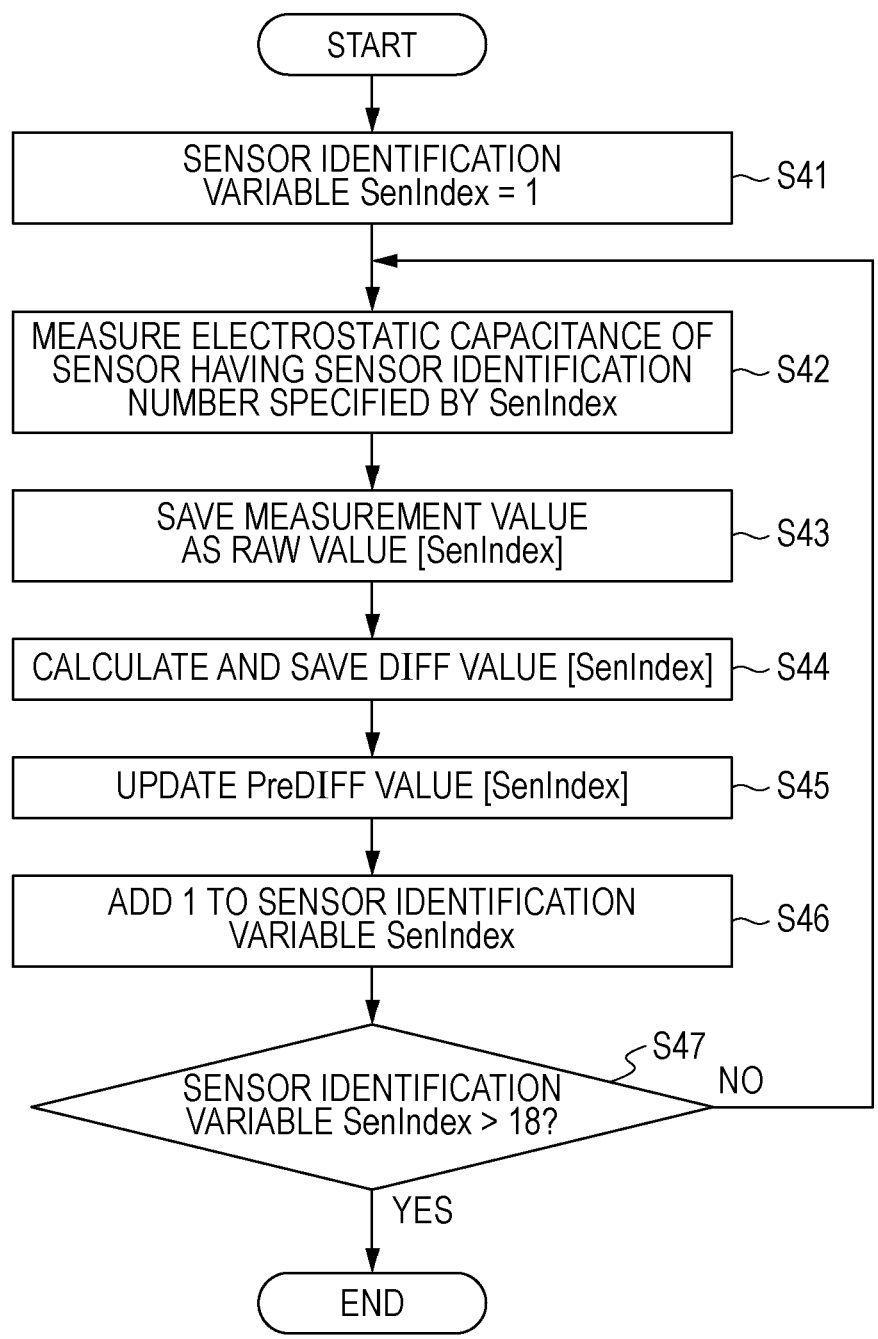
FIG. 9 is a flow chart of an electrostatic capacitance measurement according to the first exemplary embodiment.

Here, the sensor scanning operation in S31 will be described in detail. FIG. 9 is a flow chart of the sensor scanning operation. This processing is executed by the CPU 64.

First, the sensor identification variable SenIndex is set as an initial value (S41). Next, the electrostatic capacitance of the electrostatic sensor pattern specified by SenIndex is measured (S42).

Next, the measured value of the electrostatic capacitance (hereinafter referred to as RAW value) is saved (S43), and also a value obtained by subtracting the base line value from the RAW value (hereinafter referred to as DIFF value) is saved in the RAM 65 (S44).

When the saving of the DIFF value is ended, a data array PreDIFF value that saves the DIFF value at the time of the past sensor scanning operation is updated (S45).

Then, 1 is added to SenIndex to identify the next electrostatic sensor pattern (S46).

After that, it is determined whether or not the sensor identification variable SenIndex is higher than 18 (S47), and in a case where the sensor identification variable SenIndex is lower than or equal to 18, the flow returns to S43. When this operation is performed for the 18 electrostatic sensor patterns, the processing is ended (S47: YES).

Figure 10:
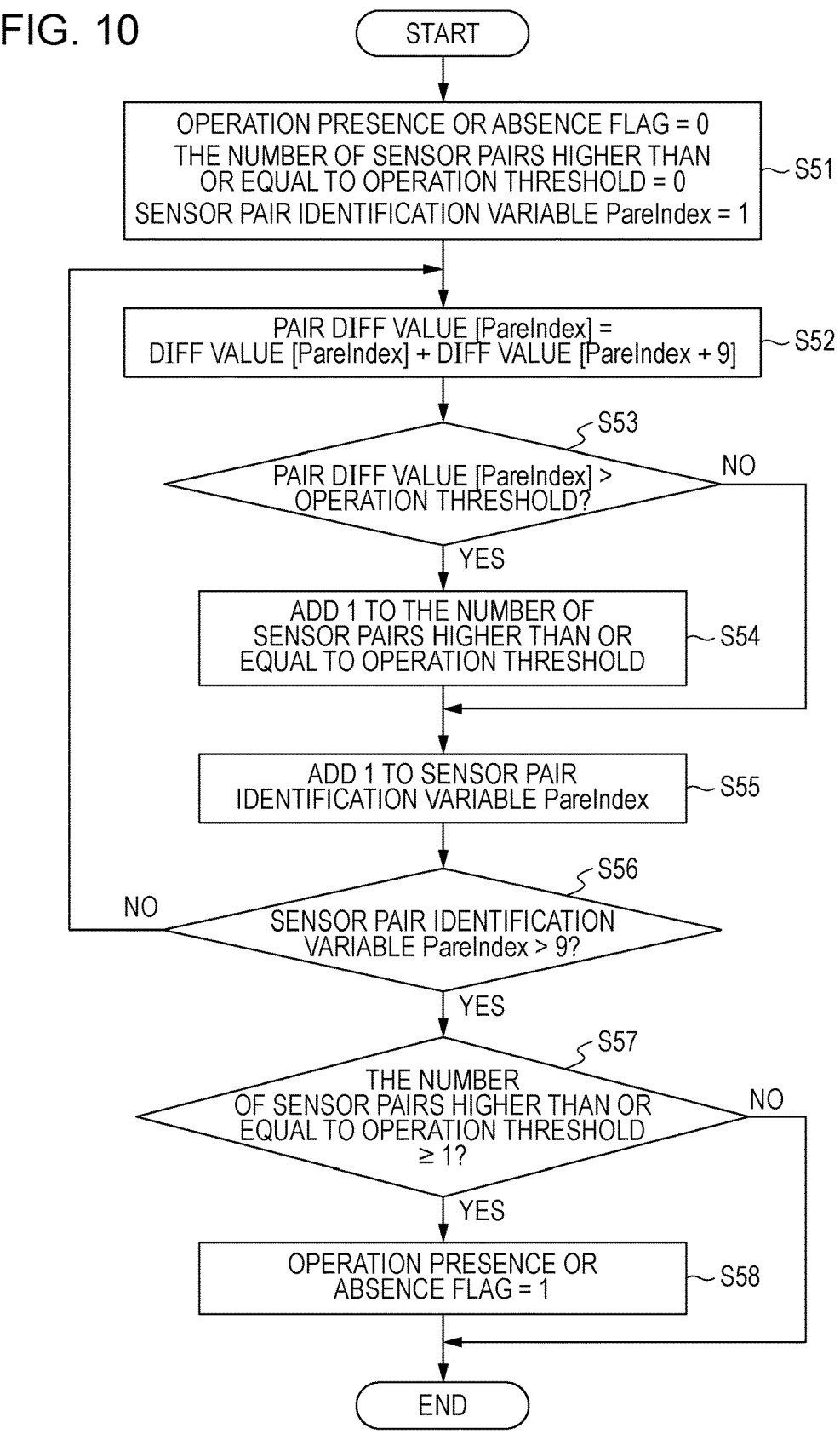
FIG. 10 is a flow chart for determining whether an operation on the touch panel is present or absent according to the first exemplary embodiment.

The determination on the presence or absence of the operation of the touch panel will be described by using FIG. 10. FIG. 10 is a flow chart for the determination on the presence or absence of the touch panel operation. This processing is executed by the CPU 64.

The determination on the presence or absence of the operation is performed by summing up the DIFF values of the two sensors on the upper and lower sides which constitute one sensor pair and determining whether or not the DIFF values of the predetermined number or more of sensor pairs exceed the operation threshold previously set in the electrostatic touch IC 12. In the case of assuming a finger having Φ of 9 mm which is a finger size of a normal human body, according to the present exemplary embodiment, the finger contacts at least one sensor pair. Therefore, it is determined that the operation is present when the DIFF values of one or more sensor pairs exceed the operation threshold. The number of sensor pairs exceeding the operation threshold at the time of the determination on the presence or absence of the operation is not limited to this and may be set in accordance with an operation object set as a target and the electrostatic sensor pattern corresponding to the object to be operated.

When the determination on the presence or absence of the operation of the touch panel is started, first, the flag indicating the presence or absence of the operation, the number of sensor pairs higher than or equal to the operation threshold, and a sensor pair identification variable are set as a default state (S51). The flag indicating the presence or absence of the operation is set as 1 when it is determined that the touch panel is operated. The number of sensor pairs higher than or equal to the operation threshold is a variable for counting the number of sensor pairs in which a pair DIFF value that will be described below exceeds the operation threshold. Then, the sensor pair identification variable is a variable for identifying the 9 sensor pairs according to the present exemplary embodiment. Therefore, in S51, the flag indicating the presence or absence of the operation is set as 0, the number of sensor pairs higher than or equal to the operation threshold is set as 0, and the sensor pair identification variable PareIndex is set as 1.

Next, the DIFF values held in the flow chart illustrated in FIG. 9 are added to each other for each sensor pair (S52). Hereinafter, a total DIFF value obtained by the addition for each sensor pair is set as the pair DIFF value.

Next, it is determined whether or not the pair DIFF value is higher than or equal to the operation threshold (S53). In a case where the pair DIFF value is higher than or equal to the operation threshold (S53: YES), 1 is added to the number of sensor pairs that are higher than or equal to the operation threshold (S54), the flow proceeds to S55. In a case where the pair DIFF value is lower than the operation threshold (S53: NO), the flow directly proceeds to S55.

In S55, 1 is added to the sensor pair identification variable to identify the sensor pair that performs the next computation.

Next, it is determined whether or not the sensor pair identification variable is higher than the number of sensor pairs provided on the sensor layer (S56). According to the present exemplary embodiment, since the 9 sensor pairs exists on the sensor layer 22, it is determined whether or not the sensor pair identification variable is higher than 9. In a case where the sensor pair variable is not higher than the number of sensor pairs provided to the sensor layer, the flow returns to S52, and the processing is continued. When the determination on whether or not the pair DIFF value is higher than or equal to the operation threshold is ended with respect to all the sensor pairs, the flow proceeds to S57, and it is determined whether or not the number of sensor pairs higher than or equal to the operation threshold is higher than or equal to 1.

When the number of sensor pairs in which the pair DIFF value is higher than or equal to the operation threshold is higher than or equal to 1 (S57: YES), the flag indicating the presence or absence of the operation is set as 1, and the determination processing on the presence or absence of the operation of the touch panel is ended to perform a base line update determination (S34). In a case where the number of sensor pairs is 0 (S57: NO), the determination processing on the presence or absence of the operation of the touch panel is ended, and the base line update processing 2 for reflecting an environment change or the like is performed (S35).

Figure 11:
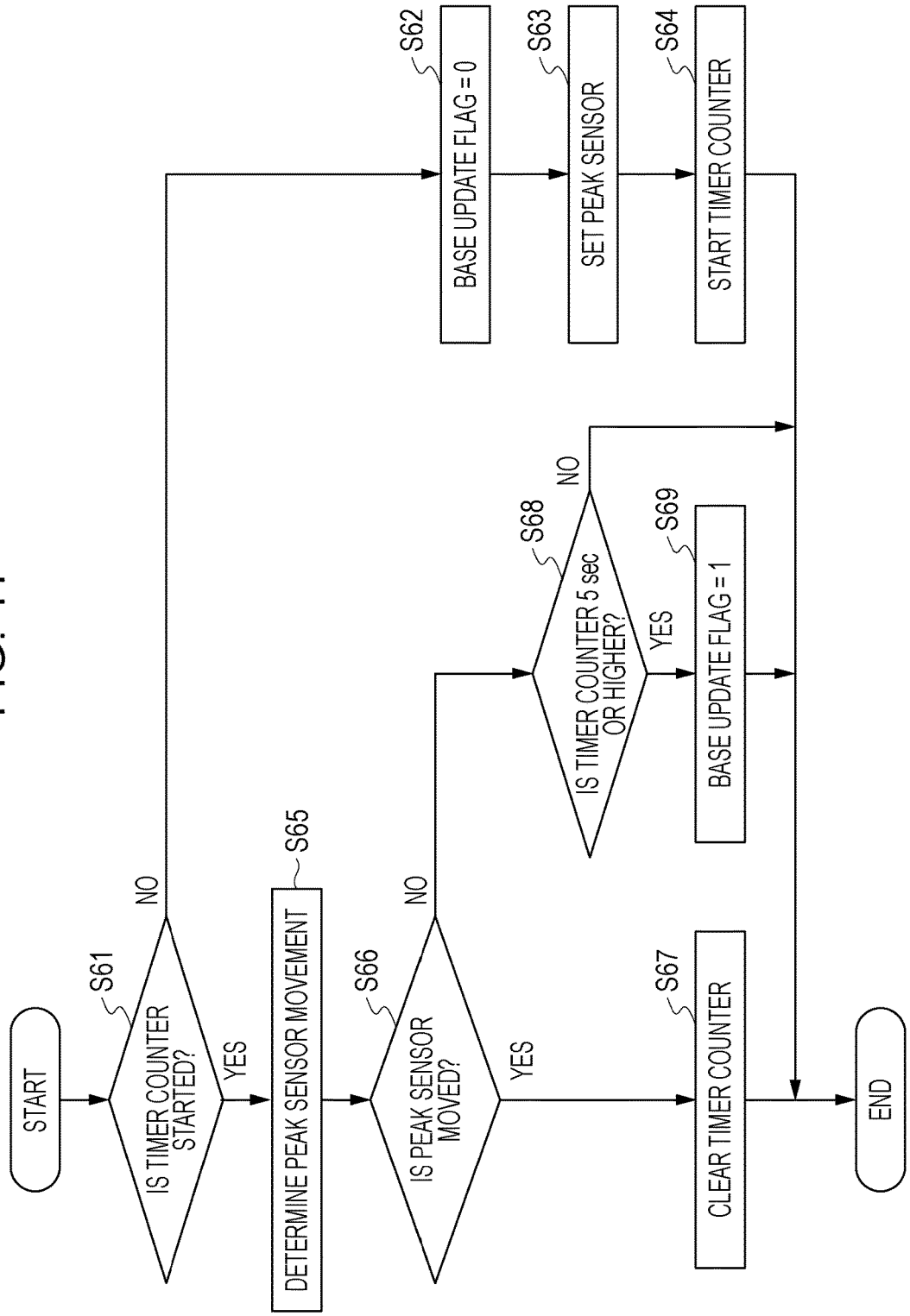
FIG. 11 is a flow chart of base line update determination processing according to the first exemplary embodiment.

Next, the base line update determination processing in S34 will be described by using FIG. 11. FIG. 11 is a flow chart of the base line update determination processing. This processing is executed by the CPU 64.

First, it is determined whether or not a timer counter is started (S61).

In a case where the timer counter is not started (S61: NO), a base update determination flag is set as 0 as an initial setting (S62). After that, the sensor pair having the highest electrostatic capacitance (hereinafter referred to as peak sensor pair) is identified to be held in the RAM 65 (S63), and the timer counter is started (S64).

In a case where the timer counter is already started (S61: YES), determination processing on whether or not the peak sensor is moved is performed (S65).

As a result of the determination, in a case where the peak sensor is moved (S66: YES), the timer counter is cleared (S67).

When the peak sensor is not moved (S65: NO), it is determined whether or not the timer counter is higher than or equal to a predetermined time (S68). According to the present exemplary embodiment, as described above, it is determined whether or not the timer counter is counted for 5 seconds or longer. In a case where the timer counter is counted for 5 seconds or longer (S68: YES), the base update determination flag is set as 1 (S69), and the base line update determination processing is ended. In a case where the timer counter is below 5 seconds (S68: NO), the base line update determination processing is ended.

Figure 12:
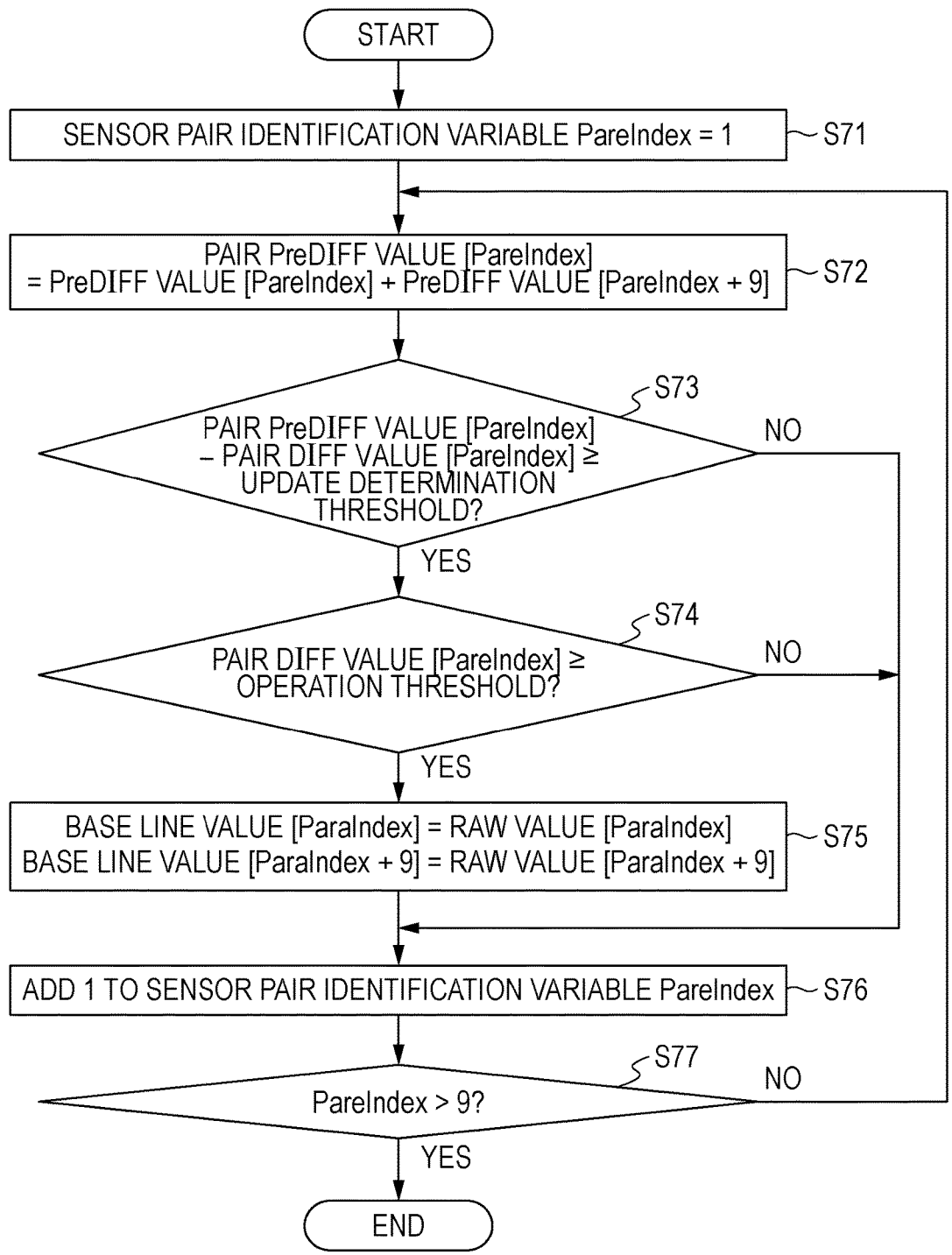
FIG. 12 is a flow chart of base line update determination processing 1 according to the first exemplary embodiment.

The base line update processing 1 in S37 will be described by using FIG. 12. FIG. 12 is a flow chart of the base line update processing 1.

First, the sensor pair identification variable (PareIndex) is set as an initial value (S71).

Next, the DIFF value (hereinafter referred to as pair PreDIFF value) at the time of the sensor scanning conducted 10 times ago of the sensor pair specified by PareIndex is calculated (S72). Specifically, the pair PreDIFF value is calculated by summing up the PreDIFF values of the two sensors constituting the sensor pair.

Next, it is determined whether or not the decrease in the electrostatic capacitance (the decrease in the DIFF value) is higher than or equal to the update determination threshold by comparing the pair PreDIFF value with the pair DIFF value calculated at the time of the sensor scanning operation in this time (S73). That is, it is determined whether or not the decrease in the electrostatic capacitance in a predetermined time (according to the present exemplary embodiment, during the sensor scannings conducted by 10 times) is higher than or equal to the update determination threshold. According to the present exemplary embodiment, it is determined whether or not a value obtained by subtracting the pair DIFF value in this time from the pair PreDIFF value is higher than or equal to the operation threshold. That is, according to the present exemplary embodiment, the update determination threshold is set as a same value as the operation threshold.

As a result of the determination, in a case where a decrease by an amount higher than or equal to the update determination threshold occurs (S73: YES) and also the pair DIFF value calculated in the sensor scanning operation in this time is higher than or equal to the operation threshold (S74: YES), the base line value is updated (S75). The update of the base line value is performed by setting the held base line value as the RAW value held in the sensor scanning operation in this time with respect to the two sensors constituting the sensor pair specified by the sensor pair identification variable ParaIndex. That is, the RAW value at a time when the decrease by the amount higher than or equal to the update determination threshold occurs and also the pair DIFF value calculated in the sensor scanning operation in this time is higher than or equal to the operation threshold is set as the base line value. As a result of the determination, in a case where the decrease by the amount higher than or equal to the update determination threshold does not occur (S73: NO) or a case where the decrease by the amount higher than or equal to the update determination threshold occurs but the pair DIFF value is below the operation threshold (S74: NO), the flow proceeds to S76.

In S76, 1 is added to the sensor pair identification variable ParaIndex, and it is determined whether or not the processing is applied to all the sensor pairs in S77. According to the present exemplary embodiment, it is determined whether or not ParaIndex is higher than 9 in S77. In a case where ParaIndex is lower than or equal to 9, the flow returns to S72, and the processing is continued. When the processing is applied to all the sensor pairs, the processing is ended.

According to the present exemplary embodiment, since a period of the sensor scanning operation is 20 ms and is extremely fast with respect to and the release operation by the user, a magnitude of the data array PreDIFF value is set as 10 to calculate the DIFF value of the sensor pair at the time of the sensor scanning conducted 10 times ago. That is, according to the present exemplary embodiment, the DIFF value of the sensor pair is calculated in the 200 ms period. In a case where the difference of the electrostatic capacitance value is taken for each scanning operation, that is, the difference of the electrostatic capacitance value is taken in the 20 ms period, the difference of the electrostatic capacitance value is extremely small, and the update determination threshold by the release operation is set to be low. Then, in a case where the update determination threshold by the release operation is set to be low, the base line value is updated while corresponding to the decrease in the electrostatic capacitance or the like caused by a slight change of a contact area by the finger of the user, and a non-touch determination is made irrespective of the touch on the panel. In view of the above, according to the present exemplary embodiment, the electrostatic capacitance value measured 10 scannings ago is compared with the measured electrostatic capacitance value for every 10 scannings, and the decrease by the amount higher than or equal to the update determination threshold is detected, so that a setting is made in which the update of the base line value is carried out only in the release operation by the user. The period of the update determination is not limited to this and may be a period with which the update determination by the release operation can accurately be determined. For the update determination threshold, for example, a value may be set with which the decrease in the electrostatic capacitance by the release set with respect to the finger having Φ of 9 mm can certainly be determined.

Figure 13:
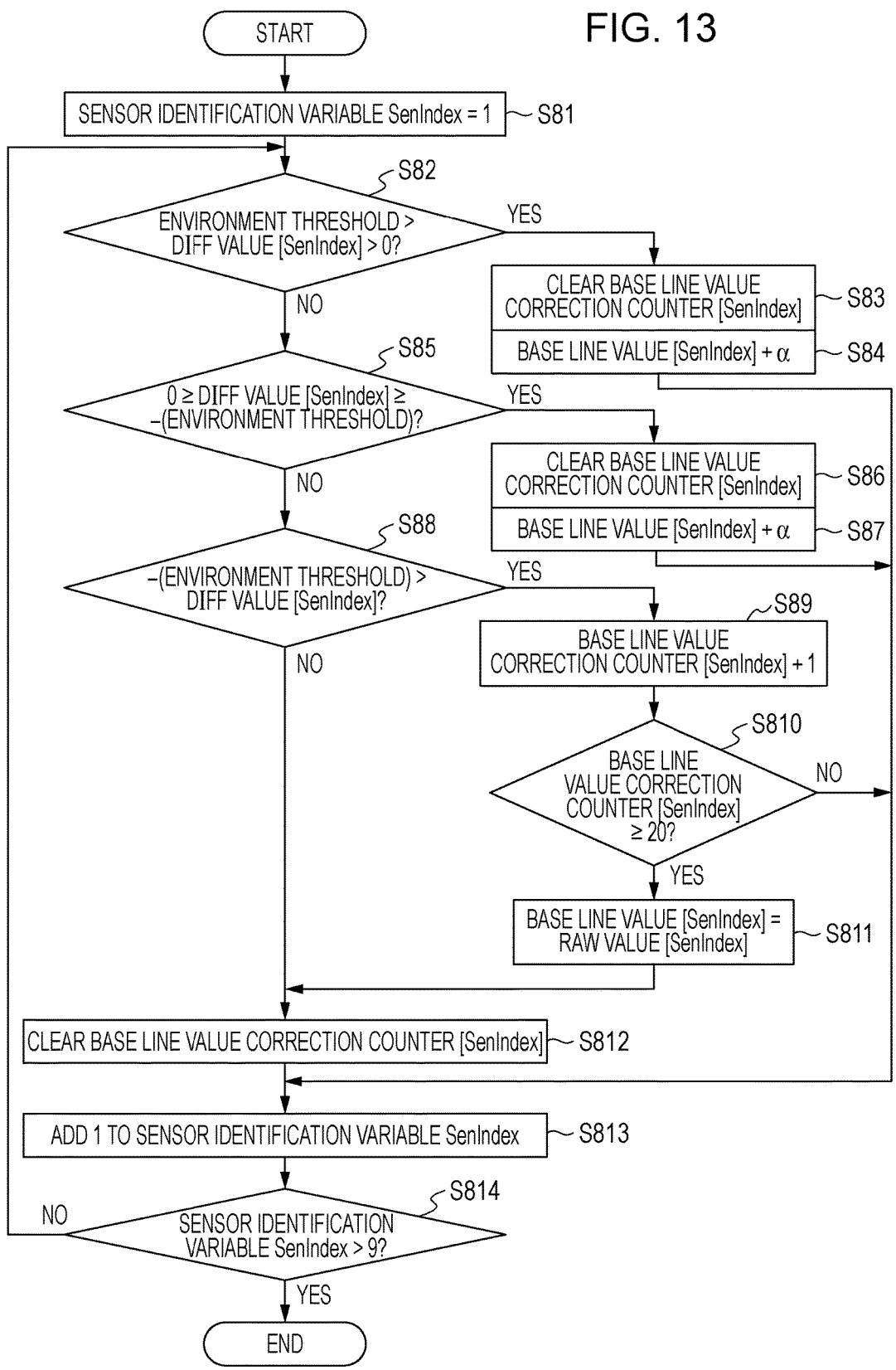
FIG. 13 is a flow chart of base line update determination processing 2 according to the first exemplary embodiment.

Next, the base line update processing 2 in S35 will be described by using FIG. 13. FIG. 13 is a flow chart of the base line update processing 2.

The base line update processing 2 is not the update processing to deal with an increase in the electrostatic capacitance based on the temperature change of the touch panel by the touch operation but is the update processing for correcting the setting of the update processing and the default state to deal with a change in the electrostatic capacitance based on the surrounding environment. The change in the electrostatic capacitance based on the surrounding environment includes, for example, the change in the electrostatic capacitance value in a case where the touch panel is not operated by a moderate change in the environment temperature or the like of the electrostatic touch panel 11. According to the present exemplary embodiment, environment thresholds are set for the respective sensors, and it is determined as to which state the DIFF value is in as compared with the environment threshold to deal with the change in the environment temperature. The update processing for correcting the setting of the default state is, for example, the update processing for performing the correction in a case where a value measured while the touch panel is operated at the time of the power supply is turned on as a base line.

In the base line update processing 2, first, the sensor identification variable SenIndex is set as an initial value (S81).

Next, it is determined whether or not the DIFF value of the sensor specified by the sensor identification variable SenIndex is higher than 0 and smaller than the environment threshold (S82). In a case where the DIFF value exceeds 0, the RAW value is higher than the base line value, and in a case where the DIFF value is lower than or equal to 0, the RAW value is lower than the base line value.

In a case where the DIFF value is higher than 0 and is lower than the environment threshold (S82: YES), the base line value correction counter is cleared (S83). After that, the base line value is updated by adding a certain value A, for example, as a predetermined value to the base line value (S84), and the flow proceeds to S813. According to this, in the next detecting operation, the DIFF value is calculated on the basis of the updated base line value. The counter in S83 is a counter for counting the number of times when the DIFF value is continuously below the environment threshold.

In a case where the DIFF value is lower than or equal to 0, it is determined whether or not the DIFF value is higher than or equal to the previously set base line change threshold, that is, according to the present exemplary embodiment, a value obtained by multiplying the environment threshold by −1 (S85).

In a case where the DIFF value is higher than or equal to the base line change threshold, that is, a case where the DIFF value is higher than or equal to the value obtained by multiplying the environment threshold by −1, the base line correction counter is created (S86). After that, the base line value is altered by subtracting the certain value A, for example, as the predetermined value from the current base line value (S87). After that, the flow proceeds to S812. According to this, in the next detecting operation, the DIFF value is calculated on the basis of the altered base line value.

Next, it is determined whether or not the DIFF value is lower than the base line change threshold (S88). For a case where the DIFF value is lower than the environment threshold, a state where the touch panel is operated at the time of the calibration is supposed. In a case where the DIFF value is lower than the environment threshold (S88: YES), 1 is added to the base line correction counter (S89), and it is then determined whether or not the counter is 20 times or higher (S810). In a case where the counter is 20 times or higher (S810: YES), processing of setting the base line value as the current RAW value is performed (S811), and the base line correction counter is cleared (S812). According to this, in the next detecting operation, the DIFF value is calculated on the basis of the altered base line value. In a case where the DIFF value is higher than or equal to the environment threshold (S88: NO), the base line correction counter is cleared (S812).

After that, 1 is added to the sensor identification variable SenIndex (S813), and it is determined whether or not the processing is performed for all the sensor pairs (S814). According to the present exemplary embodiment, it is determined whether or not the sensor pair identification variable is higher than 9. In a case where the processing is not ended for all the sensor pairs, the flow returns to S82, and the processing is continued. In a case where the processing is performed for all the sensor pairs, that is, a case where the sensor pair identification variable is higher than 9 (S814: YES), the processing is ended.

It is noted that according to the present exemplary embodiment, the counter in S820 is set as 20 times while a case in which the detection of the RAW value is affected by external noise or the like is taken into account. The counter number in S820 is not limited to this and may be set in accordance with a situation.

According to the present exemplary embodiment, the reference value is changed (updated) in accordance with the change in the electrostatic capacitance caused by the operation by the finger of the person or the like having the temperature higher than the touch panel, so that it is possible to avoid the malfunction or the state in which the user fails to operate. That is, even when the electrostatic capacitance in the non-operation state is changed before the touch operation and after the touch operation, it is possible to alleviate the dead zone corresponding to the state in which the operation of the touch panel is not normally detected. That is, the release operation and the touch operation after the release operation can more certainly be determined. According to this, it is possible to realize the stable operation of the touch panel.

Other Exemplary Embodiment

According to the above-described exemplary embodiment, it is possible to suppress the erroneous determination and the operation fault based on the temperature change of the touch panel by the touch operation.

The basic configuration of the present invention is not limited to the above-described configuration. The above-described exemplary embodiment is one device for attaining the effects of the present invention. Even when a different similar method a different parameter is used, if effects equivalent to the present invention can be attained, the case is included in the scope of the invention.

According to the above-described exemplary embodiment, the touch detection is made in a case where the difference between the electrostatic capacitance value and the reference value is higher than or equal to the operation threshold, that is, a case where the electrostatic capacitance value is higher than or equal to the total value of the reference value and the operation threshold, but the configuration is not limited to this.

According to the above-described exemplary embodiment, the base line update processing 2 is performed, but the base line update processing 2 may not be executed.

In addition, according to the above-described exemplary embodiment, for example, in a case where a change in the electrostatic capacitance at least to a certain degree occurs as compared with the electrostatic capacitance at the time of the previous scanning, that is, a case where the electrostatic capacitance is decreased by an amount higher than or equal to a predetermined threshold (hereinafter referred to as update determination threshold), the reference value is updated, but the configuration is not limited to this. For example, in a case where the variation of the electrostatic capacitance after the touch determination is higher than or equal to a set threshold, the reference value may be modified. Specifically, for example, in a case where the increase amount of the electrostatic capacitance after the touch determination (1) illustrated in FIGS. 7A and 7B is higher than or equal to the set threshold, the reference value may be updated. At this time, in a case where the release determination is made (a case where the difference between the electrostatic capacitance and the reference value is higher than or equal to the operation threshold), the reference value may gradually be decreased.

According to the above-described exemplary embodiment, the description has been given while the printer is exemplified as the information processing apparatus, but the configuration is not limited to this. For example, the present invention can be applied to an apparatus provided with the electrostatic touch panel such as a copying machine, a facsimile apparatus, a mobile phone, a PDA, an image viewer, or a digital camera.

The above-described exemplary embodiment can also be realized while the following processing is executed. That is, in the processing, software (program) for realizing the function of the above-described exemplary embodiment is supplied to a system or an apparatus via a network or various storage media, and the program is read out and executed by a computer (a CPU or an MPU) of the system or the apparatus. In addition, the program may be executed by a single computer or may also be executed by a plurality of computers in conjunction with each other. Moreover, all the above-described processings may not be realized by the software, and a part or all of the processings may also be realized by hardware.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-137061, filed Jun. 28, 2013, which is hereby incorporated by reference herein in its entirety.

What is claimed is:

1. An apparatus comprising at least one processor coupled to at least one memory, the at least one processor executing to:
determine, based on a comparison of a sensed electrostatic capacitance value of an electrostatic sensor provided to an electrostatic touch panel and a reference electrostatic capacitance value, whether a portion of the electrostatic touch panel is being touched by an operator;
determine whether the sensed electrostatic capacitance value decreases, while it is determined that the portion of the electrostatic touch panel is being touched by the operator, more than a threshold in a predetermined period; and
in response to a determination that the sensed electrostatic capacitance value decreases more than the threshold in the predetermined period while it is determined that the portion of the electrostatic touch panel is being touched by the operator, increase the reference electrostatic capacitance value while it is determined that the portion of the electrostatic touch panel is being touched by the operator, the increase causing the apparatus to change the determination that the portion of the electrostatic touch panel is being touched by the operator to a determination that the portion of the electrostatic touch panel is no longer being touched by the operator.

2. The apparatus according to claim 1, wherein the at least one processor further executes to determine that the portion of the electrostatic touch panel is being touched in a case where a difference between the electrostatic capacitance value of the electrostatic sensor and the reference electrostatic capacitance value is higher than or equal to another threshold, and to determine that the electrostatic touch panel is not being touched in a case where the difference is lower than the another threshold.

3. The apparatus according to claim 2,
wherein the electrostatic sensor comprises a plurality of pairs, each pair including a first electrostatic sensor pattern and a second electrostatic sensor pattern, and
wherein the at least one processor further executes to determine that the portion of the electrostatic touch panel is being operated in a case where a number of the pairs, in which a sum of a difference between the reference electrostatic capacitance value and the electrostatic capacitance value of the first electrostatic sensor pattern and a difference between the reference electrostatic capacitance value and the electrostatic capacitance value of the second electrostatic sensor pattern is greater than or equal to the threshold, is greater than or equal to a predetermined number, and to determine that the portion of the electrostatic touch panel is not being touched in a case where a number of the pairs, in which the sum is greater than or equal to the another threshold, is less than the predetermined number.

4. The apparatus according to claim 3, wherein the first pattern and the second pattern are arranged so as to face each other.

5. The apparatus according to claim 4, wherein the at least one processor further executes to modify a reference electrostatic capacitance value for an electrostatic sensor pair among the plurality of electrostatic sensor pairs, in a case where a variation of a difference between an electrostatic capacitance value of the electrostatic sensor pair and the reference electrostatic capacitance value for the electrostatic sensor pair in the predetermined period is greater than or equal to the threshold and also the difference between the electrostatic capacitance value of the electrostatic sensor pair and the reference electrostatic capacitance value for the electrostatic sensor pair is higher than or equal to a second threshold.

6. The apparatus according to claim 2,
wherein the electrostatic sensor comprises a pair including a first electrostatic sensor pattern and a second electrostatic sensor pattern, and
wherein the at least one processor further executes to determine that the portion of the electrostatic touch panel is being operated in a case where a sum of a difference between the reference electrostatic capacitance value and the electrostatic capacitance value of the first electrostatic sensor pattern and a difference between the reference electrostatic capacitance value and the electrostatic capacitance value of the second electrostatic sensor pattern is greater than or equal to a second threshold, and to determine that the portion of the electrostatic touch panel is not being touched in a case where the sum is less than the second threshold.

7. The apparatus according to claim 1, wherein the at least one processor further executes to set another reference electrostatic capacitance value obtained by adding a predetermined value to the reference electrostatic capacitance value as a new reference electrostatic capacitance value in a case where it is determined that the portion of the electrostatic touch panel is not being touched and the difference between the electrostatic capacitance value of the electrostatic sensor and the reference electrostatic capacitance value is lower than an environment threshold.

8. The apparatus according to claim 7, wherein the at least one processor further executes to set another reference electrostatic capacitance value obtained by subtracting a predetermined value from the reference electrostatic capacitance value as a new reference electrostatic capacitance value in a case where it is determined that the portion of the electrostatic touch panel is not being touched and the difference between the electrostatic capacitance value of the electrostatic sensor and the reference electrostatic capacitance value is lower than a second threshold that is lower than a value obtained by multiplying the environment threshold by −1.

9. The apparatus according to claim 1, wherein the at least one processor further executes to modify the reference electrostatic capacitance value into an electrostatic capacitance value of the electrostatic sensor which is measured at a timing when a variation of the electrostatic capacitance value of the electrostatic sensor in the predetermined time becomes greater than or equal to the threshold.

10. The apparatus according to claim 1, wherein the at least one processor further executes to modify the reference electrostatic capacitance value into a value obtained by adding a predetermined value to an electrostatic capacitance value of the electrostatic sensor which is measured at a timing when a variation of the electrostatic capacitance value of the electrostatic sensor in the predetermined time becomes greater than or equal to the threshold.

11. The apparatus according to claim 1, wherein an electrostatic capacitance value which is measured for a first time after a power supply of the electrostatic touch panel is turned on, is set as the reference electrostatic capacitance value.

12. The apparatus according to claim 1, wherein the at least one processor further executes to:
   count an operation time in a case where it is determined that the portion of the electrostatic touch panel is being touched, and
   modify the reference electrostatic capacitance value in a case where it is determined that the portion of the electrostatic touch panel is being touched, the counted operation time is longer than or equal to a predetermined time, and the variation of the electrostatic capacitance value in the predetermined period is greater than or equal to the threshold.

13. A method implemented by an apparatus comprising:
   determining, based on a comparison of a sensed electrostatic capacitance value of an electrostatic sensor provided to electrostatic touch panel and a reference electrostatic capacitance value, whether a portion of the electrostatic touch panel is being touched by an operator;
   determining whether the sensed electrostatic capacitance value decreases, while it is determined that the portion of the electrostatic touch panel is being touched by the operator, more than a threshold in a predetermined period; and
   in response to a determination that the sensed electrostatic capacitance decreases more than the threshold in the predetermined period while it is determined that the portion of the electrostatic touch panel is being touched by the operator, increase the reference electrostatic capacitance value while it is determined that the portion of the electrostatic touch panel is being touched by the operator, the increase causing the apparatus to change the determination that the portion of the electrostatic touch panel is being touched by the operator to a determination that the portion of the electrostatic touch panel is no longer being touched by the operator.

14. A non-transitory computer-readable recording medium storing a program for causing a computer in an apparatus to execute a method comprising:
   determining, based on a comparison of a sensed electrostatic capacitance value of an electrostatic sensor provided to electrostatic touch panel and a reference electrostatic capacitance value, whether a portion of the electrostatic touch panel is being touched by an operator;
   determining whether the sensed electrostatic capacitance value decreases, while it is determined that the portion of the electrostatic touch panel is being touched by the operator, more than a threshold in a predetermined period; and
   in response to a determination that the sensed electrostatic capacitance value decreases more than the threshold in the predetermined period while it is determined that the portion of the electrostatic touch panel is being touched by the operator, increase the reference electrostatic capacitance value while it is determined that the portion of the electrostatic touch panel is being touched by the operator, the increase causing the apparatus to change the determination that the portion of the electrostatic touch panel is being touched by the operator to a determination that the portion of the electrostatic touch panel is no longer being touched by the operator.

* * * * *